(12) United States Patent
Hsu et al.

(10) Patent No.: US 7,675,584 B2
(45) Date of Patent: Mar. 9, 2010

(54) HOUSING STRUCTURE WITH FRAME AND BEZEL FOR A DISPLAY MODULE HAVING PROTRUSION/S AT LOWER PORTION OF BEZEL TO CREATE UPWARD DISPLACEMENT OF THE FRONT-SURFACE PORTION OF BEZEL COVERING THE DISPLAY MODULE WHEN FASTENED TO FRAME

(75) Inventors: Chun-Chi Hsu, Hsin-Chu (TW); Sung-Po Chen, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 419 days.

(21) Appl. No.: 11/715,471

(22) Filed: Mar. 8, 2007

(65) Prior Publication Data
US 2007/0273808 A1    Nov. 29, 2007

(30) Foreign Application Priority Data
May 26, 2006   (TW) .............................. 95118835 A

(51) Int. Cl.
*G02F 1/1333*   (2006.01)
(52) U.S. Cl. ...................................................... 349/58
(58) Field of Classification Search .............. 349/58–60
See application file for complete search history.

(56) References Cited

U.S. PATENT DOCUMENTS 6,424,391 B1 *   7/2002   Tsukamoto et al. ........... 349/58
2004/0189889 A1 *   9/2004   Nitto et al. ..................... 349/58

* cited by examiner

*Primary Examiner*—John Heyman
(74) *Attorney, Agent, or Firm*—Bacon & Thomas, PLLC

(57) ABSTRACT

The present invention relates to a housing structure for a display module. The structure comprises: a frame having a cavity for receiving a display module therein; and a bezel having a front-surface portion and a plurality of side portions connecting the front-surface portion thereto. When the bezel is assembled with the frame, the bezel enfolds part of the frame, and the front-surface portion of the bezel covers part of the surface of the display module. Besides, at least one of the side portions has at least one fastening hole and at least one protruding portion formed on a single side of the fastening hole away from the front-surface portion. Therefore, when the housing structure is fixed to an electronic device, the front-surface portion of the housing structure of the present invention will not press upon the surface of the display module.

16 Claims, 5 Drawing Sheets

HOUSING STRUCTURE WITH FRAME AND BEZEL FOR A DISPLAY MODULE HAVING PROTRUSION/S AT LOWER PORTION OF BEZEL TO CREATE UPWARD DISPLACEMENT OF THE FRONT-SURFACE PORTION OF BEZEL COVERING THE DISPLAY MODULE WHEN FASTENED TO FRAME

BACKGROUND OF THE INVENTION

1. Field of the Invention

The present invention relates to a housing structure, and more particularly, to a housing structure for a display module.

2. Description of Related Art

In recent years, liquid crystal display modules have been widely applied in portable electronic devices, e.g. cellular phones, notebook computers, PDAs, etc, as to provide a display function. As shown in FIG. 1A, a conventional notebook computer 1 includes a main body 11 and a display portion 12, in which the display portion 12 is formed of a liquid crystal display module 13 attached to a jig system 121 by screws, for example. However, the engagement of the screws persistently apply a torsional force upon the bezel (not shown) of the liquid crystal display module, which often leads to the deformation of the bezel and causes display abnormality of the liquid crystal display module, such as the "ripple" as shown in FIG. 11A. The mechanism of such display abnormality is further described in detail below.

FIG. B is a schematic cross-sectional view taken along A-A' of the display portion 12 in FIG. 1A, wherein the liquid crystal display module 13 comprises a casing 14, a liquid crystal display panel 15, a backlight module 16 and a bezel 17. Besides, the backlight module 16 includes a reflecting plate 161, a light guide plate 162, and a plurality of optical films 163, wherein the plurality of optical films may be prism film(s) and/or diffuser film(s).

To have the liquid crystal display module 13 be fixed to the jig system 121 of the display portion 12, a screw 18 is applied to engage with the threaded holes of the jig system 121 and holes of the bezel 17. Since the screw 18 is continuously generating a torsional force upon the bezel 17, the bezel 17 becomes deformed gradually, with a front-surface portion 171 pressing against the front surface 151 of the liquid crystal display panel 15, thereby creating a dent on the surface 151 as shown in FIG. 1B. As a result, a display abnormality will be seen in the image shown on the display portion 12, such as the "ripple" in FIG. 1A, and the display quality of the liquid crystal display module 13 can be badly affected.

In order to overcome the above problem due to the deformation of the bezel, some solutions have been proposed, such as the one illustrated in FIG. 2. In this solution, a plurality of buffer cleavages (the two buffer cleavages 231, 232 located, respectively, alongside the holes 221, 222) are formed on the edge (where the front-surface portion 21 and the side portion 22 of the bezel 2 connects with each other), so as to prevent any torsional force generating by the screws (not shown) from transferring onto the front-surface portion 21 and to reduce the pressure exerting upon the surface of the liquid crystal display panel. However, such means still possesses several defects. First, defining cleavages on the bezel surface will weaken the structural strength of the bezel, and thus the liquid crystal display module 13 is not rigid enough to withstand external impact. Moreover, although these buffer cleavages 231, 232 may prevent the torsional force from directly exerting upon the front-surface portion 21, the force can still be transferred to the front-surface portion through another channel, such as the portion between the two buffer cleavages 231, 232. As a result, this solution may be able to solve the display abnormality that takes place nearby the area around the screws; however, the problem remains likely to occur at other areas between the screws. In other words, the solution with means of defining the cleavages still cannot completely prevent the display abnormality of the liquid crystal display module from happening.

Therefore, it is desirable for the industry to devise an improved housing structure and a liquid crystal display module having such structure that can simply be structured yet without sacrificing the overall structural strength of the bezel, and be able to prevent any kinds of display abnormality of the liquid crystal display module from happening.

SUMMARY OF THE INVENTION

The present invention relates to a housing structure for a display module that comprises a frame having a cavity on an inner side for receiving a display module therein, and a bezel having a front-surface portion and a plurality of side portions connecting the front-surface portion thereto. When the bezel is assembled with the frame, the bezel enfolds part of the frame, and the front-surface portion of the bezel covers part of the surface of the display module. Besides, at least one of the side portions has at least one fastening hole and at least one protruding portion formed on a far end side of the fastening hole away from the front-surface portion.

Moreover, the present invention also provides a liquid crystal display module that comprises: a backlight module for providing a light source; a liquid crystal display panel locating over one side of the backlight module and receiving the light provided by the backlight module; a frame having a cavity on an inner side for receiving the backlight module and the liquid crystal display panel therein; and a bezel having a front-surface portion and a plurality of side portions connecting the front-surface portion thereto. When the bezel is assembled with the frame, the bezel enfolds part of the frame, and the front-surface portion of the bezel covers part of the surface of the display module. Besides, at least one of the side portions has at least one fastening hole and at least one protruding portion formed on a far end side of the fastening hole away from the front-surface portion.

Accordingly when using multiple screws to fix both the housing structure and the display module of the present invention onto an electronic device, e.g. a notebook computer, the housing structure of the present invention can minimize the deformation due to the torsional force created by the engagements of the screws with the protruding portion formed on the side portions of the bezel. At the point, the type of the protruding portion is not intended to be limited and it can be a strip-like protrusion in any size or a protrusion in any kind of shape. Therefore, due to the presence of these protruding portions formed on the side portions, the side portions of the bezel of the housing structure according to the present invention will not press upon the front surface of the liquid crystal display module when the liquid crystal display module having the housing structure of the present invention is fixed to an electronic device, e.g. a notebook computer. Rather a certain distance is maintained from the side portion of the housing structure to the front surface of the display module, creating a space in between, such that when a liquid crystal display module having the housing structure of the present invention is fixed to a jig system of a notebook computer, the display of the liquid crystal display module will not show any kind of abnormality, such as the "ripple" or leak of light and the display quality of the liquid crystal display module can therefore be improved.

The bezel of the housing structure of the present invention can have any number of side portions, each having at least one fastening hole. Preferably, each of the two opposing side portions of the bezel has at least one fastening hole. The side portions of the bezel of the housing structure of the present invention can have any number of fastening holes; preferably the number of the fastening holes is fewer than 8. The side portions of the bezel of the housing structure of the present invention can be defined in any form. Preferably, the front-surface portion is integrated with the side portions in a frame-like structure or the front-surface portion, and the plurality of side portions are assembled into one piece with an attaching element thereinbetween. The bezel of the housing structure of the present invention can be made in any material. Preferably, the bezel is made of metal, plastic, or the combination thereof. The frame of the housing structure of the present invention can be made of any material. Preferably, the frame is made of metal, plastic, or the combination thereof. The side portions of the bezel of the housing structure of the present invention can have any number of protruding portions in any kinds of shape. Preferably, at least one round protrusion or at least one strip-like protrusion is on the side portions of the bezel. The protruding portions on the side portions of the bezel of the housing structure of the present invention can be formed in any kind of arrangement. Preferably, the protruding portions are formed along the edge of at least one fastening hole or in between of two adjacent fastening holes.

The bezel of the liquid crystal display module of the present invention can have any number of side portions, each having at least one fastening hole. Preferably, each of the two opposing side portions of the bezel has at least one fastening hole. The side portions of the bezel of the liquid crystal display module of the present invention can have any number of fastening holes. Preferably, the number of the fastening holes is fewer than eight (8). The side portions of the bezel of the liquid crystal display module of the present invention can be defined in any form. Preferably, the front-surface portion and the plurality of side portions are formed in a frame-like structure as one piece, or the front-surface portion and the plurality of side portions are assembling with an attaching element into one piece. The bezel of the liquid crystal display module of the present invention can be made of any material. Preferably, the bezel is made of metal, plastic or the combination thereof. The frame of the liquid crystal display module of the present invention can be made in any material. Preferably, the frame is made of metal, plastic or the combination thereof. The side portions of the bezel of the liquid crystal display module of the present invention can have any number of protruding portions in any kind of shape. Preferably, at least one round protrusion or at least one strip-like protrusion is on the side portions of the bezel. The protruding portions on the side portions of the bezel of the liquid crystal display module of the present invention can be formed in any kind of arrangement. Preferably, the protruding portions are formed along the edge of at least one fastening hole or in between of two adjacent fastening holes. The liquid crystal display module of the present invention can be applied to any type of electronic devices, such as a notebook computer, a desktop computer, a cellular phone or any other kind of portable electronic devices.

DETAILED DESCRIPTION OF THE EMBODIMENT

Figure 1A:
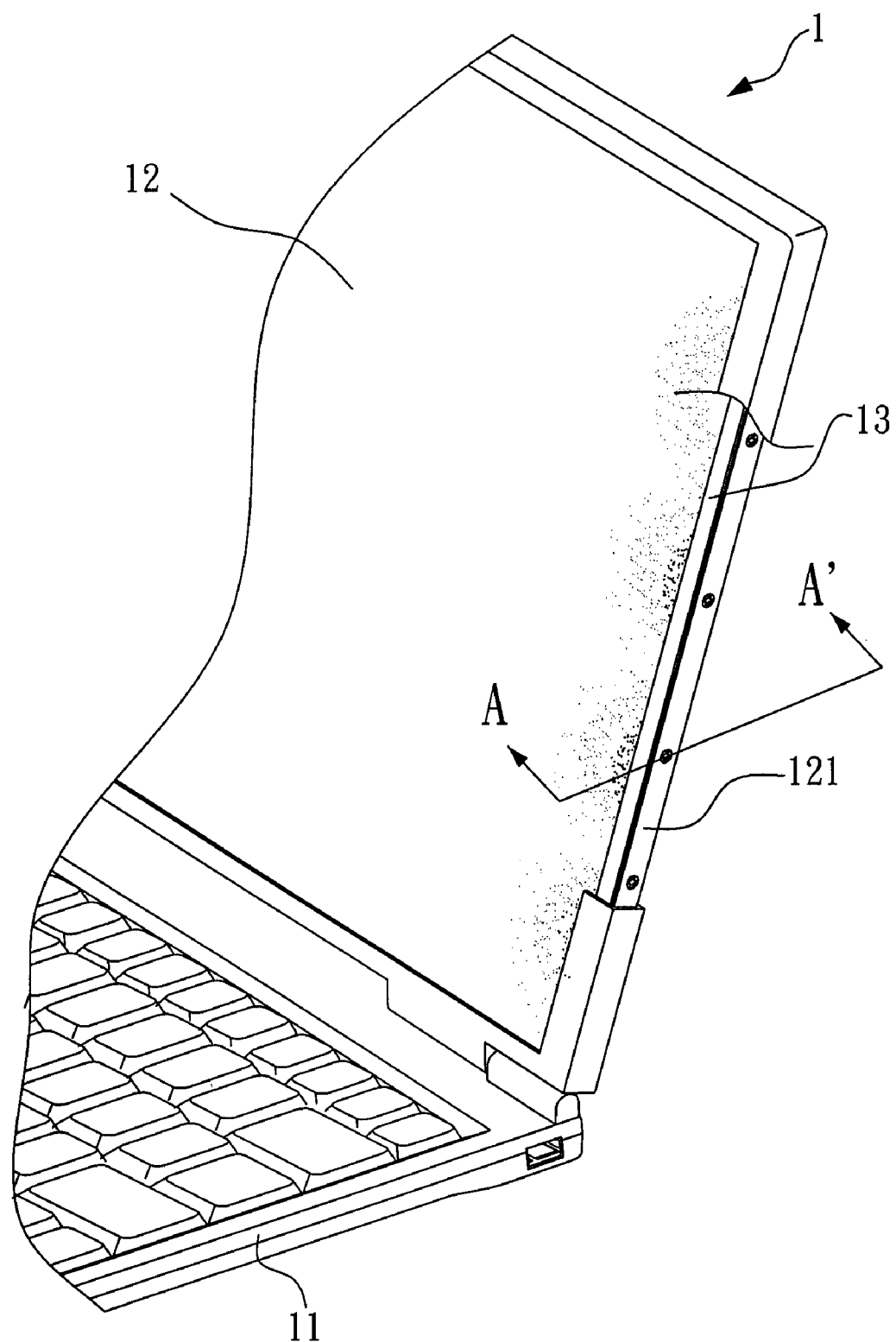
FIG. 1A is a schematic diagram illustrating a notebook computer with a conventional liquid crystal display module.
Figure 1B:
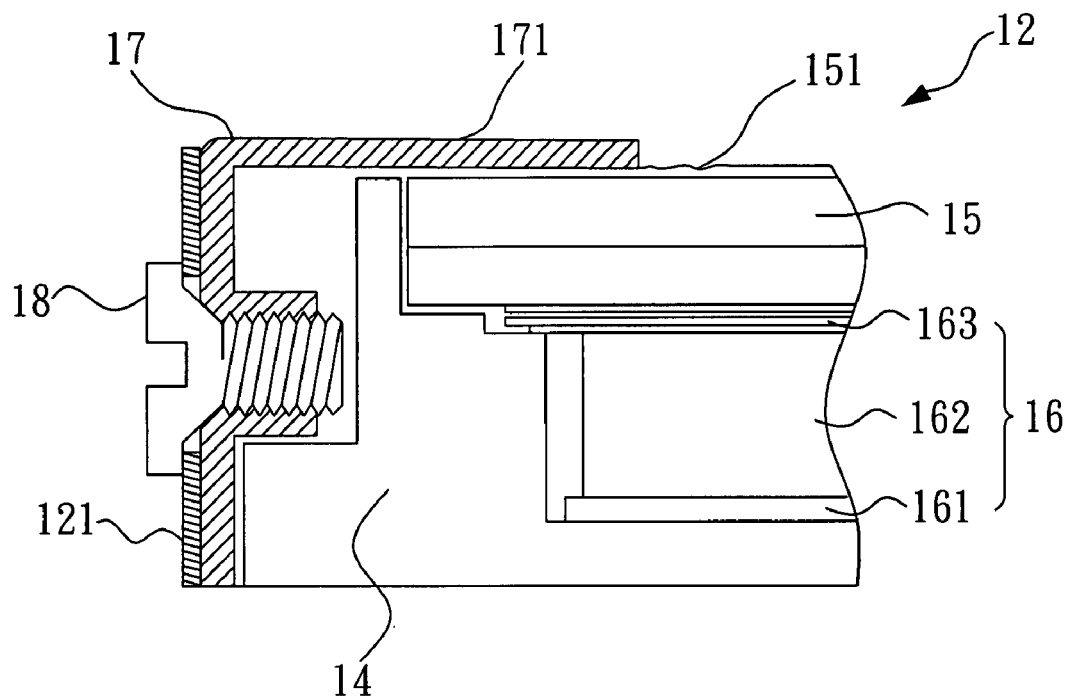
FIG. 1B is a schematic cross-sectional view of the liquid crystal display module taken along A-A' in FIG. 1A.
Figure 2:
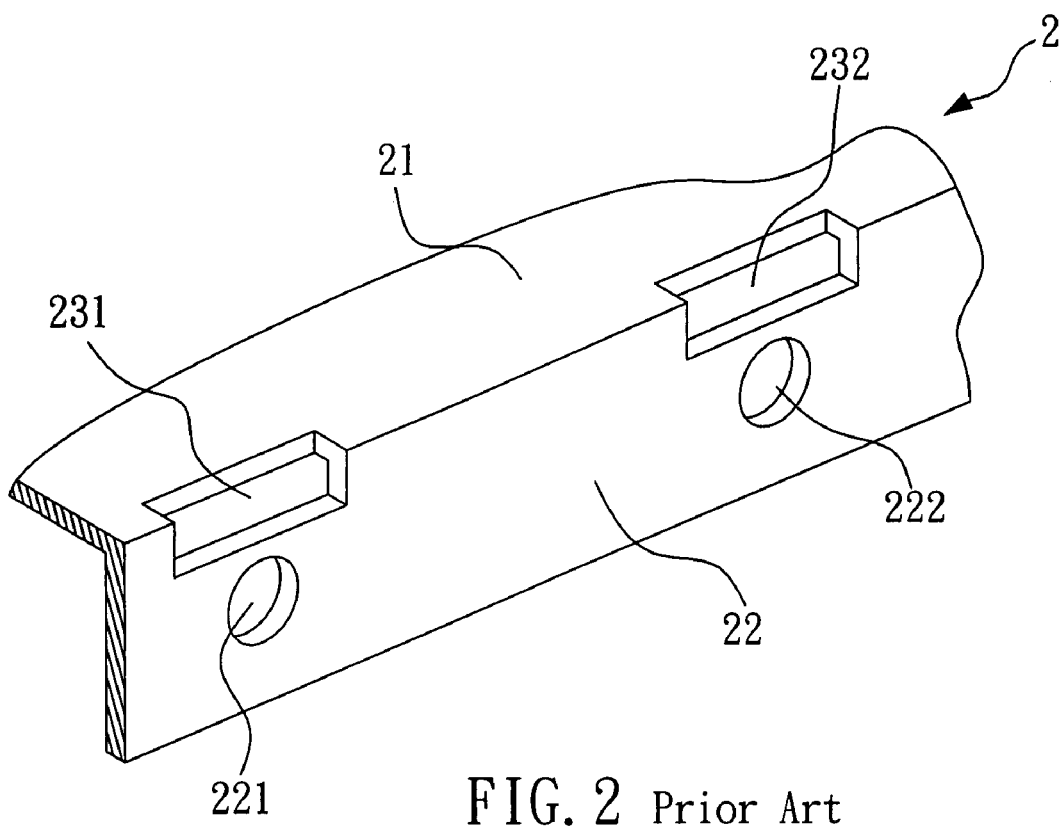
FIG. 2 is another schematic diagram illustrating the bezel of a conventional liquid crystal display module.
Figure 3A:
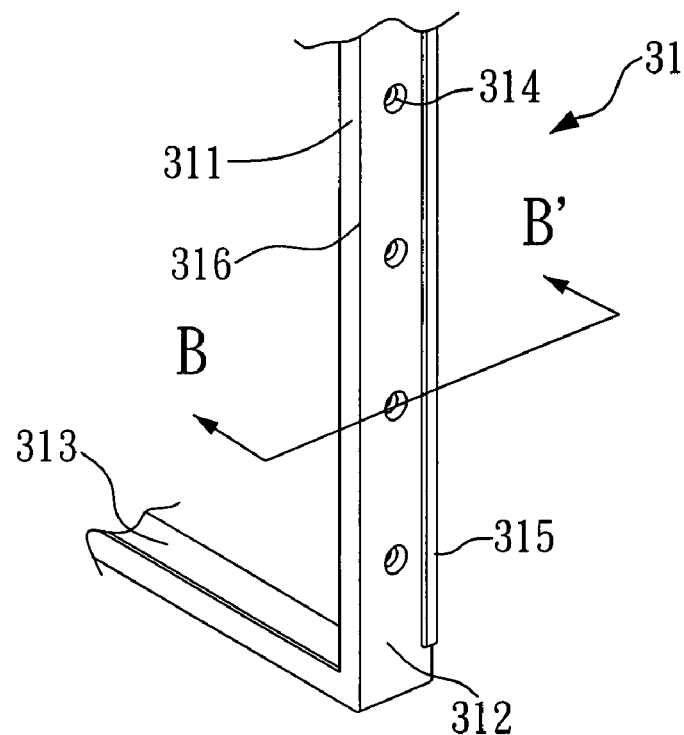
FIG. 3A illustrates the bezel of the housing structure according to the first preferred embodiment of the present invention.
Figure 3B:
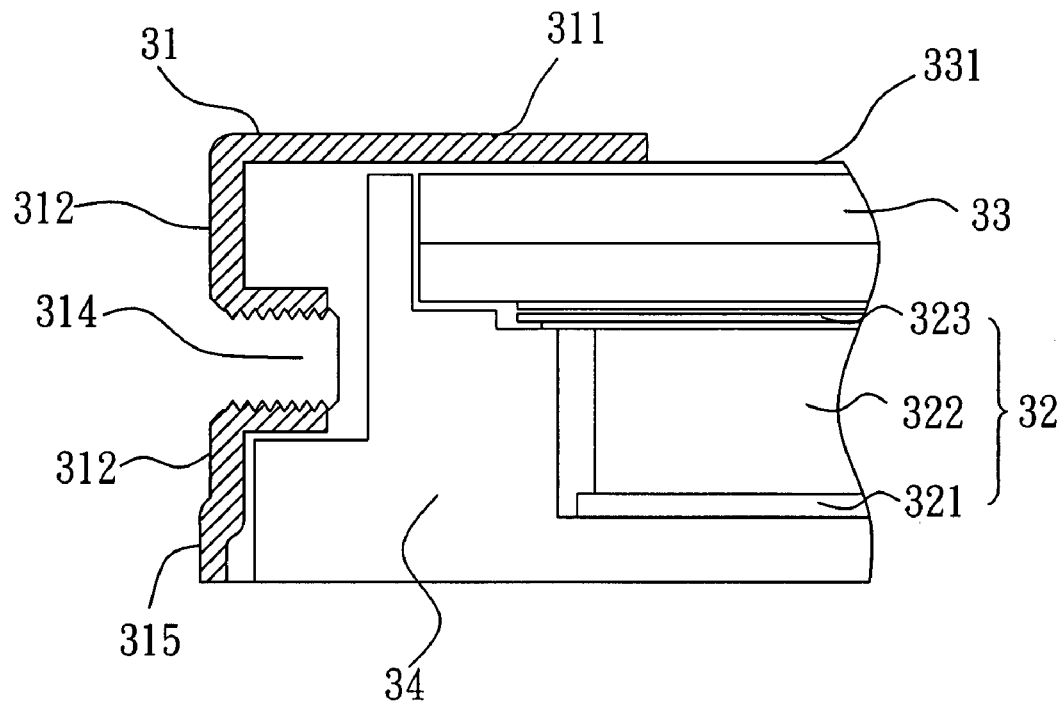
FIG. 3B is a schematic cross-sectional view of the liquid crystal display module having the housing structure according to the first embodiment of the present invention, wherein the schematic cross-sectional view of the housing structure is taken along B-B' in FIG. 3A.

FIG. 3A is a schematic diagram that illustrates a bezel 31 of the housing structure according to the first embodiment of the present invention. FIG. 3B is a schematic cross-sectional view of the liquid crystal display module having the housing structure according to the first embodiment of the present invention, wherein the schematic cross-sectional view of the housing structure is taken along B-B' in FIG. 3A. As shown in FIG. 3B, the housing structure of the first embodiment of the present invention comprises a frame 34, which is able to receive a display module (e.g. a liquid crystal display module, a plasma module, a field emission module or an OLED module, etc) in the frame 34 and the bezel 31, in which the bezel 31 has a front-surface portion 311 and side portions 312, 313. In the present embodiment, the display module received by the frame 34 is a liquid crystal display module. Besides, the side portion 312 has a plurality of fastening holes 314. As shown in FIG. 3A, since the side portion 312 comprises a strip-like portion 315 located on one side of the fastening holes 314 far away from the front-surface portion 311 and the strip-like protrusion 315 is formed extending along the edge of the side portion 311, the perpendicular distance from the center (not shown) of the fastening holes 314 on the side portion 312 to the edge 316 (where the front-surface portion 311 and the side portion 312 connect with each other) is shorter than that from the strip-like protrusion 315 to the edge 316. Besides, as shown in FIG. 3B, the liquid crystal display module comprises the bezel 31, which provides shield and protection, a backlight module 32 as light source, a liquid crystal display panel 33 for displaying and a frame 34, The frame 34 receives both the backlight module 32 and the liquid crystal display panel 33 in a cavity. The front-surface portion 311 of the bezel 31 extends in a direction parallel to a front surface 331 of the liquid crystal display panel 33 and covers the periphery of the front surface 331. Besides, the backlight module 32 includes a reflecting plate 321, a light guide plate 322, and a plurality of optical films 323, wherein the plurality of optical films may be prism film(s) and/or diffuser film(s).

Figure 3C:
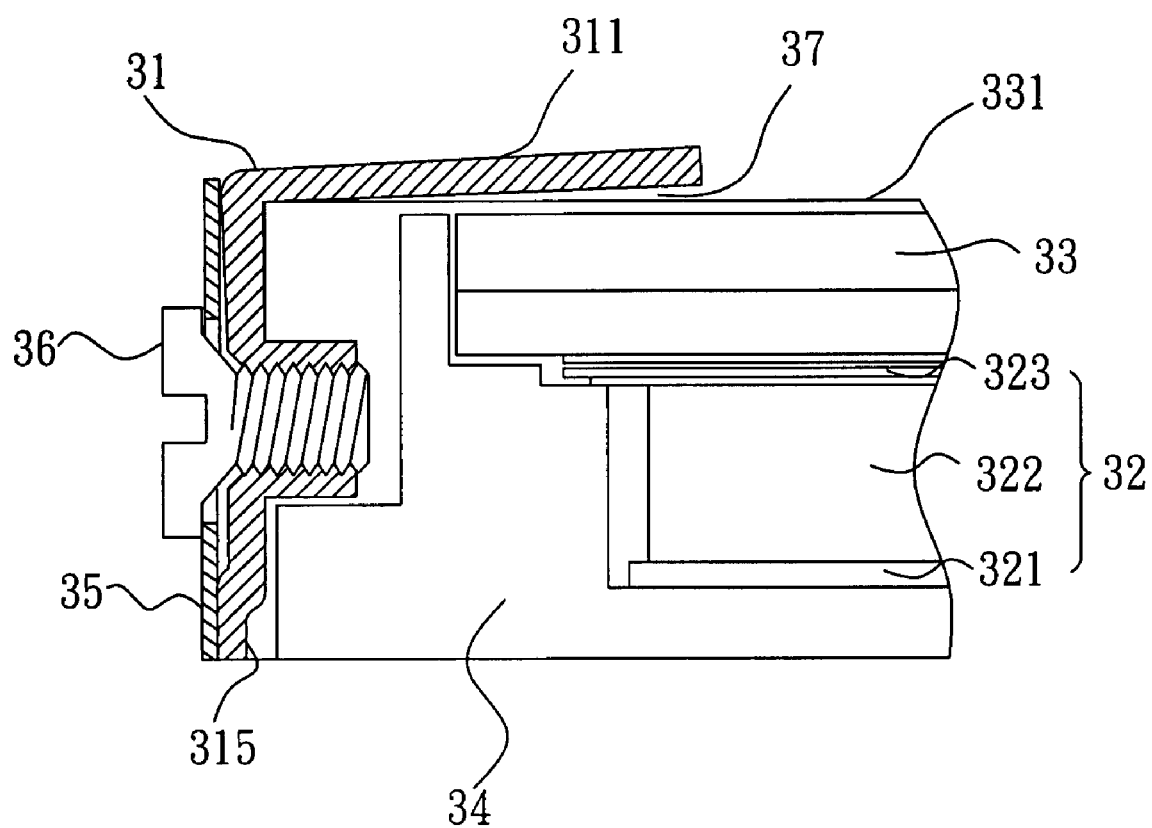
FIG. 3C is schematic diagram illustrating the liquid crystal display module having the housing structure according to the first embodiment of the present invention, while the liquid crystal display module is fixed to the jig system of an electronic device.

As the liquid crystal display module having the housing structure according to the first embodiment of the present invention is to be installed in an electronic device (e.g. notebook computer), the liquid crystal display module has to be positioned to the jig system 35 of the electronic device, such that each fastening hole 314 formed on the side portion 312 of the liquid crystal display module corresponds to the respective holes (not shown) formed on the jig system 35. Then, plural screws 36 are applied to engage with the fastening holes 314 of the bezel 31 respectively. Accordingly, the liquid crystal display module is now securely mounted to the electronic device (e.g. a notebook computer), as illustrated in FIG. 3C.

However, when the screws 36 are engaged with the fastening holes 314 of the bezel 31 respectively, these screws will generate a torsional force upon the bezel 31 continuously, resulting in the deformation of the bezel 31 at various levels. But with the housing structure according to the first embodiment of the present invention, the strip-like protrusion 315 formed along an edge of the side portion 312 will limit the direction of the displacement of the bezel 31 and reduce the deformation of the bezel 31 to the minimum. As a result, after the screws 36 are engaged, the front-surface portion 311 of the bezel 31 of the housing structure according to the first embodiment of the present invention will not press upon the front surface 331 of the liquid crystal display panel 33. Moreover, the front-surface portion 311 of the bezel 31 of the housing structure according to the first embodiment of the present invention becomes slightly tilted outward from the display module, thus a space 37 between the front-surface portion 311 of the bezel 31 and the front surface 331 of the liquid crystal display panel 33 is formed. Therefore, the housing structure according to the first embodiment of the present invention is able to prevent the display abnormality of the liquid crystal display module from happening. Besides, the strength of the housing structure according to the first embodiment of the present invention is also improved.

Figure 4:
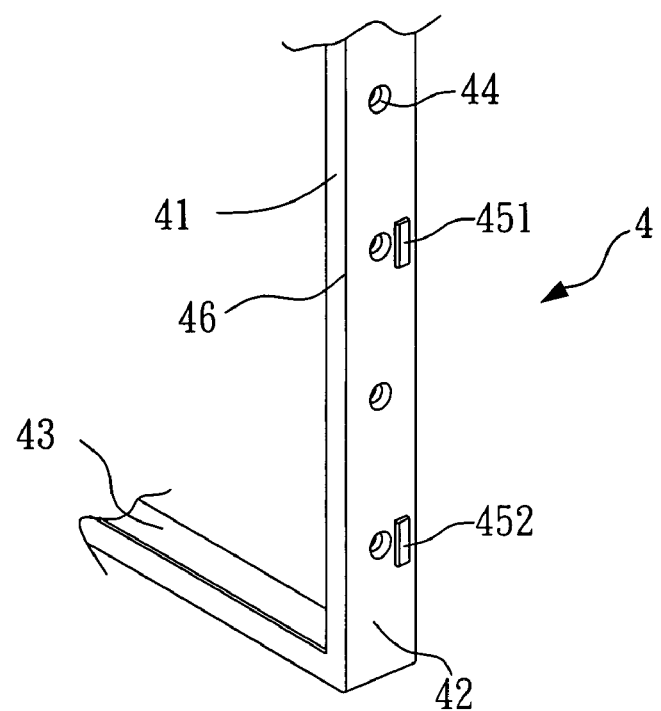
FIG. 4 illustrates the housing structure according to the second embodiment of the present invention.

FIG. 4 is a schematic diagram that illustrates the bezel of housing structure according to the second embodiment of the present invention, wherein a bezel 4 comprises a front-surface portion 41 and plural side portions 42, 43. Besides, the side portion 42 has a plurality of fastening holes 44. As shown in FIG. 4, since the side portion 42 comprises plural strip-like protrusions 451, 452 located on one side of the fastening holes 44 far away from the front-surface portion 41, the perpendicular distance from the center (not shown) of the fastening holes 44 to the edge 46 (where the front-surface portion 41 and the side portion 42 connect with each other) is shorter than that from the strip-like protrusions 451, 452 to the edge 46. For brevity, it shall be understood that the frame of the housing structure according to the second embodiment of the present invention is not shown in the figure.

As described above, when a display module (e.g. a liquid crystal display module, a plasma display module, a field emission display module or an OLED display module, etc) having the housing structure according to the second embodiment of the present invention is fixed to an electronic device (e.g. a notebook computer, a PDA or any other kinds of portable devices equipped with a display portion), the front-surface portion 41 of the bezel 4 of the housing structure according to the second embodiment of the present invention will not press upon the surface of the display portion (not shown). Therefore, the housing structure according to the second embodiment of the present invention can prevent the display abnormality of the display portion from happening, such as the "ripple".

Figure 5:
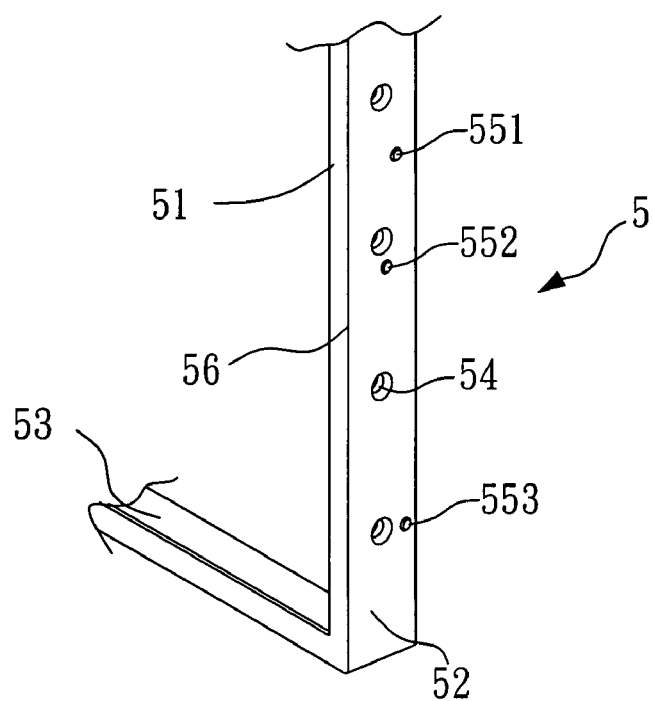
FIG. 5 illustrates the housing structure according to the third embodiment of the present invention.

FIG. 5 is a schematic diagram that illustrates the bezel of housing structure according to the third embodiment of the present invention, wherein a bezel 5 comprises a front-surface portion 51 and plural side portions 52, 53. Besides, the side portion 52 has a plurality of fastening holes 54. As shown in FIG. 5, since the side portion 52 comprises plural round protrusions 551, 552, 553, wherein some of the round protrusions are located on the parts of the side portions 52 between two adjacent fastening holes 54 (round protrusion 551, 552), and other round protrusions are located on one side of the fastening holes 54 far away from the front-surface portion 51 (round protrusion 553), the perpendicular distance from the center (not shown) of the fastening holes 54 to the edge 56 (where the front-surface portion 51 and the side portion 52 connect with each other) is shorter than that from the round protrusions 551, 552, 553 to the edge 56. For brevity, it shall be understood that the frame of the housing structure and the display module being fixed (e.g. a liquid crystal display module, a plasma display module, a field emission display module or an OLED display module, etc) according to the third embodiment of the present invention are not shown in the figure.

As described above, when a display module having the housing structure according to the third embodiment of the present invention is fixed to an electronic device (e.g. a notebook computer, a PDA or any other kinds of portable devices with a display portion), the front-surface portion 51 of the bezel 5 of the housing structure according to the third embodiment of the present invention will not press upon the surface of the display portion (not shown). Therefore, the housing structure according to the third embodiment of the present invention can prevent the display abnormality of the display portion from happening, such as the "ripple".

To sum up, by using multiple screws to fix both the housing structure and the display module of the present invention onto an electronic device, e.g. a notebook computer, the housing structure of the present invention can minimize the deformation due to the torsional force created by the engagement of the screws with the protruding portion (the type of the protruding portion is not intended to be limited and can be a strip-like protrusion in any size or projection in any kinds of shape) formed on the side portions of the bezel. That is, due to the application of these protruding portions as mentioned above, the side portions of the bezel of the housing structure according to the present invention do not apply pressure upon the front surface of the liquid crystal display module when the liquid crystal display module is fixed to an electronic device, e.g. a notebook computer. Rather, a certain distance is maintained from the side portion of the housing structure to the front surface of the display module, forming a space therein-between. As a result, when a liquid crystal display module having the housing structure of the present invention is fixed to a jig system of a notebook computer, the display of the liquid crystal display module will not show any kinds of abnormality, and the displaying quality of the liquid crystal display module can therefore be improved.

Although the present invention has been explained in relation to its embodiments, it is to be understood that many other possible modifications and variations can be made without departing from the scope of the invention as hereinafter claimed.

What is claimed is:

1. A housing structure for use in a display module, comprising:
   a frame, having a cavity on an inner side, for receiving the display module therein; and
   a bezel having a front-surface portion and a plurality of side portions connecting the front-surface portion thereto;
   wherein the bezel enfolds part of the frame, and the front-surface portion of the bezel covers part of the surface of the display module when the bezel is assembled with the frame;

wherein at least one of the side portions having at least one fastening hole and at least one protruding portion is formed on one single side of the fastening hole away from the front-surface portion so that the protruding portion of the bezel creates an upward displacement of the front-surface portion of the bezel from the covered surface of the display module when fastened to the frame.

2. The housing structure for a display module of claim 1, wherein each of the two opposing side portions of the bezel has at least one fastening hole.

3. The housing structure for a display module of claim 1, wherein the fastening hole is a threaded hole.

4. The housing structure for a display module of claim 1, wherein the front-surface portion is integrated with the side portions.

5. The housing structure for a display module of claim 1, wherein the protruding portion is a round protrusion.

6. The housing structure for a display module of claim 1, wherein the protruding portion is a strip-like protrusion.

7. The housing structure for a display module of claim 1, wherein the protruding portion is formed along the edge of the fastening hole.

8. The housing structure for a display module of claim 1, wherein the protruding portion is formed in between two adjacent fastening holes.

9. A liquid crystal display module comprising:

a backlight module for providing a light source;

a liquid crystal display panel locating over one side of the backlight module;

a frame, having a cavity on an inner side, for receiving the backlight module and the liquid crystal display panel therein; and a bezel having a front-surface portion and a plurality of side portions connecting the front-surface portion thereto;

wherein the bezel enfolds part of the frame, and the front-surface portion of the bezel covers part of the surface of the display module when the bezel is assembled with the frame;

wherein at least one of the side portions having at least one fastening hole and at least one protruding portion is formed on one single side of the fastening hole away from the front-surface portion so that the protruding portion of the bezel creates an upward displacement of the front-surface portion of the bezel from the covered surface of the display module when fastened to the frame.

10. The liquid crystal display module of claim 9, wherein two opposing side portions of the bezel each having at least one fastening hole.

11. The liquid crystal display module of claim 9, wherein the fastening hole is a threaded hole.

12. The liquid crystal display module of claim 9, wherein the front-surface portion and the side portions are assembled together as one piece.

13. The liquid crystal display module of claim 9, wherein the protruding portion is a round protrusion.

14. The liquid crystal display module of claim 9, wherein the protruding portion is a strip-like protrusion.

15. The liquid crystal display module of claim 9, wherein the protruding portion is formed along the edge of the fastening hole.

16. The liquid crystal display module of claim 9, wherein the protruding portion is formed in between two adjacent fastening holes.

* * * * *